W. S. Paddock.
Elastic Furniture Tip.
Nº 92639.        Patented Jul. 13. 1869.
Fig: 1.
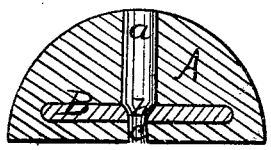
Witnesses
C. W. Burdet
Thos. Houghton
Inventor
Wm. S. Paddock

United States Patent Office.

WILLIAM S. PADDOCK, OF ALBANY, NEW YORK.

Letters Patent No. 92,639, dated July 13, 1869.

IMPROVED ELASTIC TIP FOR FURNITURE, &c.

The Schedule referred to in these Letters Patent and making part of the same.

*To all whom it may concern:*

Be it known that I, WILLIAM S. PADDOCK, of Albany, in the county of Albany, and State of New York, have invented a new and improved Elastic Tip for Furniture; and I do hereby declare that the following is a full, clear, and exact description thereof, reference being had to the accompanying drawing, forming part of this specification, and to the letters of reference marked thereon.

Figure 1 is a vertical central section of my invention.

The object of my invention is to construct a new and useful article of manufacture that may be used on a variety of household-articles, for the purpose of defending them from abrasion, or to prevent them from making a noise when brought in contact with each other.

This object I accomplish by covering a metal washer, B, with an elastic cover, A, of peculiar shape, as shown in fig. 1, one side of the elastic cover being flat, and the other side of a semispherical shape, so that the washer thus covered with an elastic covering may act as a fender to whatever articles it may be attached.

Provision is also made for inserting a screw or nail by which to fasten the aforementioned covered washer firmly to its required position.

The head of the screw or nail employed is sunken within the body of the elastic cover, so as not to be liable to injure any thing that may come in contact with the elastic cover A.

In securing very large elastic covered washers to their place, bolts and nuts may be used, the head of the bolt will also be below the outer surface of the elastic covering A.

B designates a metal washer; its outer edges may be rounded off, as shown in the accomganying drawing. Said washer is also centrally perforated and countersunk, as shown at $b$, for the purpose of receiving the head of a screw or nail, by which said washer B is secured to the article upon which it is to be used.

A designates an elastic cap or cover surrounding the metallic washer B, as shown in fig. 1, and is centrally perforated, as shown in the accompanying drawing, the lower perforation $c$ being the size of the hole in the washer B, and the upper part of the elastic cover or cap A has a larger perforation than the bottom part, as shown at $a$.

The upper portion $a$, of the central perforation of the cover A, is made larger than its lower portion $c$, for the purpose of allowing the head of a nail or screw to pass freely down to the washer B, and to bear firmly upon said washer.

It will be seen that the principal use of washer B is to form a solid substance to receive the pressure of a nail or screw-head, by which the elastic cover may be secured.

These elastic tips may be used as door-stops, to prevent door-knobs from breaking the plaster or otherwise injuring the walls of rooms. When placed under table-leaves, they will prevent the same from striking violently against the table-legs; or if attached to the bottoms of table or chair-legs, they will prevent the abrasion of oil-cloths and carpets.

It will be seen from the above description that elastic tips will be useful for a variety of purposes.

What I claim as new, and desire to secure by Letters Patent, is—

The centrally-perforated elastic cover or cap A, in combination with a centrally-perforated metallic washer B, and an independent screw, $e$, substantially as herein shown and described.

WM. S. PADDOCK.

Witnesses:
C. W. BENDER,
THOS. HOUGHTON.